(12) United States Patent
Siebert et al.

(10) Patent No.: US 9,023,447 B2
(45) Date of Patent: May 5, 2015

(54) ADHESIVE TAPE FOR CABLE BANDAGING

(75) Inventors: Michael Siebert, Schenefeld (DE); Andreas Wahlers-Schmidlin, Guderhandviertel (DE)

(73) Assignee: Tesa SE, Hamburg (DE)

( * ) Notice: Subject to any disclaimer, the term of this patent is extended or adjusted under 35 U.S.C. 154(b) by 0 days.

(21) Appl. No.: 13/406,851

(22) Filed: Feb. 28, 2012

(65) Prior Publication Data

US 2012/0231230 A1     Sep. 13, 2012

(30) Foreign Application Priority Data

Mar. 7, 2011    (DE) .......................... 10 2011 005 162

(51) Int. Cl.
*C09J 7/02* (2006.01)
*B32B 7/12* (2006.01)
*C09J 7/04* (2006.01)
*H02G 3/04* (2006.01)
(Continued)

(52) U.S. Cl.
CPC .......... *C09J 7/045* (2013.01); *Y10T 428/24752* (2015.01); *Y10T 428/14* (2015.01); *C09J 2201/28* (2013.01); *C09J 2203/302* (2013.01); *C09J 2400/263* (2013.01); *C09J 2407/00* (2013.01); *C09J 2433/00* (2013.01); *C09J 2483/00* (2013.01); *H02G 3/0462* (2013.01); *H02G 3/305* (2013.01); *D04B 21/145* (2013.01)

(58) Field of Classification Search
CPC .. C09J 7/045; C09J 2407/00; C09J 2400/263; C09J 2201/28; C09J 2433/00; C09J 2483/00; C09J 2203/302; H02G 3/0462; H02G 3/305; D04B 21/145; Y10T 428/24752; Y10T 428/14
USPC ........................................ 428/40.1, 189, 222
See application file for complete search history.

(56) References Cited

U.S. PATENT DOCUMENTS 3,111,449 A * 11/1963 Gold et al. ................... 428/40.6
6,432,529 B1    8/2002 Harder et al.
8,409,683 B2 *  4/2013 Kosaka et al. ............... 428/40.1
(Continued)

FOREIGN PATENT DOCUMENTS

DE    10011788 A1    3/2002
DE    10042732 A1    3/2002
(Continued)

OTHER PUBLICATIONS

English Language Abstract of EP578151 found on esp@cenet.com.
(Continued)

*Primary Examiner* — Patricia L Nordmeyer
(74) *Attorney, Agent, or Firm* — Norris McLaughlin & Marcus PA

(57) ABSTRACT

Adhesive tape consisting of a carrier having a top face and a bottom face, an adhesive layer and a liner, the carrier having a width $B_T$ based on the transverse direction, and also of an adhesive layer applied on the bottom face of the carrier, characterized in that applied on the open side of the adhesive layer is a sheetlike liner having a transverse-direction-based width $B_A$, which is greater than or equal to the width $B_T$, the liner having an offset relative to the carrier in transverse direction, with a width $B_{VS}$.

12 Claims, 4 Drawing Sheets

(51) Int. Cl.
*H02G 3/30* (2006.01)
*D04B 21/14* (2006.01)

(56) References Cited

U.S. PATENT DOCUMENTS

| | | | |
|---|---|---|---|
| 2006/0231192 A1* | 10/2006 | Wahlers-Schmidlin et al. | 156/184 |
| 2009/0258176 A1* | 10/2009 | Muta et al. | 428/41.5 |

FOREIGN PATENT DOCUMENTS

| DE | 102005017381 A1 | | 10/2006 |
|---|---|---|---|
| DE | 102008038472 A1 | | 2/2010 |
| DE | 102008058226 A1 | | 2/2010 |
| DE | 102008056554 A1 | * | 5/2010 |
| EP | 71212 A2 | | 7/1982 |
| EP | 578151 A1 | | 7/1993 |
| EP | 0621326 A1 | | 4/1994 |
| EP | 1911824 B1 | | 7/2007 |
| EP | 2034576 A1 | * | 3/2009 |
| GB | 1356340 | | 6/1974 |
| WO | 0218509 A1 | | 3/2002 |
| WO | 2005085379 A1 | | 9/2005 |

OTHER PUBLICATIONS

English Language Abstract of EP71212 found on esp@cenet.com.
English Language Abstract of DE10011788 found on esp@cenet.com.
English Language Abstract of EP1911824 found on esp@cenet.com.
English Language Abstract of EP2034576 found on esp@cenet.com.
English Language Abstract of EP0621326 found on esp@cenet.com.
German Search Report for 10 2011 005 162.7 dated Mar. 7, 2011.
English Language Abstract for DE 10042732 found on esp@cenet.com.
English Language Abstract for DE 102005017381 found on esp@cenet.com.
English Language Abstract for DE 102008038472 found on esp@cenet.com.
English Language Abstract for DE 102008058226 found on esp@cenet.com.
English Language Abstract for EP 2034576 found on esp@cenet.com which is the equivalent of DE 202007012475.

* cited by examiner

ADHESIVE TAPE FOR CABLE BANDAGING

The invention relates to an adhesive tape preferably for the bandaging of elongate materials such as more particularly leads or cable harnesses, having a carrier and having a preferably pressure-sensitive adhesive coating applied at least on one side of the carrier. The invention further relates to the use of the adhesive tape and also to an elongate material such as a cable loom which is jacketed with the adhesive tape of the invention.

In numerous sectors of industry, bundles composed of a multiplicity of electrical leads are wrapped either before installation or when already mounted, in order to reduce the space taken up by the bundle of leads, by means of bandaging, and also, in addition, to obtain a protective function. With film-backed adhesive tapes, a certain protection against ingress of fluid is achieved; with adhesive tapes based on thick nonwovens or foams as carriers, damping properties are obtained; and, when stable, abrasion-resistant carrier materials are used, a protective function against scuffing and rubbing is achieved.

In order to improve the damping and enhance the abrasion resistance, there are adhesive tapes known whose carriers consist of a plurality of layers.

With EP 1 723 210 A1, a highly abrasion-resistant and noise-damping tape for the bandaging of cable looms was disclosed, consisting of a carrier having a first outer layer A, joined firmly over the entire area of the outer layer A to a second layer C.

The outer layer A may be a velour, scrim, woven or knitted fabric, the layer C a porous sheetlike structure such as a textile having an open but stable three-dimensional structure, such as a foam or such as a foamed film.

Both outer layers have the same width and are joined to one another over their entire surfaces, by means of a further layer of adhesive, without an offset, meaning that their side edges finish flush.

EP 1 911 824 A1 describes a cable wrapping tape having a tapelike carrier which is designed as an assembly of a woven fabric with a nonwoven and which is furnished at least on one side, over the full area, with a self-adhesive pressure-sensitive adhesive layer. The woven fabric has at least 20 warp threads per cm and more than 22 weft threads per cm. Here again, both textile plies have the same width and are joined to one another over their entire surfaces, by means of a further layer of adhesive, without an offset, and so their side edges finish flush.

On the basis of its two-ply construction, the adhesive tape is capable of attaining abrasion class E under LV 312 both on a 5 mm diameter mandrel and on a 10 mm diameter mandrel.

The adhesive tape envelops a cable loom in a wrapping of helical line form.

A consequence of the two materials with full-area lamination that are described in EP 1 723 210 A1 and EP 1 911 824 A1, however, is a relatively high stiffness, which is a disadvantage on spiral wrapping and which leads in particular to flagging at the tape ends.

Flagging—in the case of an adhesive tape wrapped around an element—refers to the tendency of an end of the adhesive tape to stand up. The cause is the combination of the adhesive's holding power, the stiffness of the carrier and the diameter of the cable harness.

As a result of the carrier being furnished over its full area with an adhesive coating, it is impossible to avoid contact of the adhesive with the cable jacketing.

This results in a high level of stiffness to the cable loom, since at every point the tape is joined by the adhesive to the cable loom.

In the case of the jacketing of a cable loom with the adhesive tape in a helical line form, the individual wrapping plies overlap, meaning that at these points there are four textile plies one above the other, likewise resulting in a very stiff cable loom. Simply as a result of the thickness of the resulting cable loom, it is not possible, given the close installation conditions which presently prevail in automotive construction, to rule out the risk of the adhesive tape becoming damaged at sharp edges, thereby tearing open the cable bundling.

EP 2 034 576 A1 describes an adhesive tape comprising a carrier and an adhesive applied thereto, this tape having a largely tack-free internal area, by the lamination to the adhesive layer of a second carrier, which has a lower width than the width of the first carrier.

Various embodiments are envisaged. For instance, the second carrier may run flush with a side edge of the first carrier at one side edge, with the first carrier, with the adhesive layer, protruding relative to the other side edge of the second carrier. The first carrier, with the adhesive layer, may also protrude on both sides relative to the side edges of the second carrier, or it may be that the first carrier, with the adhesive layer, protrudes on one side relative to one side edge of the second carrier, and the second carrier, on the other side of the first carrier, protrudes on one side relative to one side edge of the first carrier. Another possibility, furthermore, is for the second carrier to consist of at least two, mutually separate, carrier parts, with the first carrier part having a first width and the second carrier part having a second width, the sum of the widths of the carrier parts being smaller than the width of the first carrier.

The wrapping of a cable loom with the adhesive tape described takes place here not—as usual—in helical line form, but instead such that, during wrapping, a longitudinal axis of the tape is oriented substantially parallel to the running direction of the cable loom. Viewed in cross section, the adhesive tape lies in the form of an Archimedean spiral around the cable loom. This kind of wrapping is referred to below as "packaging of the cable loom".

If it were to be used in helical line form, it would be possible for the adhesive to come into contact with the cable jacketing, thus leading again to the disadvantages outlined above.

Also known are adhesive tapes—from EP 1 315 781 B1 or from DE 20 52 271 A1, for example—where the adhesive is applied in longitudinal direction in the form of a strip which has a smaller width than the carrier material of the adhesive tape.

When a cable loom is jacketed in a movement with a helical line form, the effect is that the strip of the adhesive is bonded completely to the adhesive tape of the underlying wrapped ply. However, the strip line, as it is known, is technically and economically expensive to produce.

The testing and classifying of adhesive tapes for cable jacketing takes place in the motor industry in accordance with extensive bodies of standards such as, for example, LV 312-1 "Protection systems for wire harnesses in motor vehicles, adhesive tapes; test guideline" (October 2009), as a joint standard of the companies Daimler, Audi, BMW and Volkswagen, or the Ford specification ES-XU5T-1A303-aa (revised version September 2009) "Harness Tape Performance Specification". In the text below, these standards are referred to in abbreviated form as LV 312 and Ford specification, respectively.

The sound damping effect of an adhesive tape is determined on the basis of a defined test system and test method. The adhesive tapes are then classified as shown below in Table 1:

TABLE 1

Sound damping classification to LV 312-1 (October 2009)

| Sound damping class | Requirement |
| --- | --- |
| A no sound damping | 0 to ≤2 dB(A) |
| B low sound damping | >2 to ≤5 dB(A) |
| C moderate sound damping | >5 to ≤10 dB(A) |
| D high sound damping | >10 to ≤15 dB(A) |
| E very high sound damping | >15 dB(A) |

The abrasion resistance of an adhesive tape is determined in accordance with LV 312-1 likewise on the basis of a defined test method. The classification of the adhesive tapes in terms of their abrasion resistance, for a mandrel diameter of 5 mm, is given in Table 2:

TABLE 2

Abrasion resistance classification to LV 312-1 (October 2009)

| Abrasion class | Requirement |
| --- | --- |
| A no abrasion protection | <100 strokes |
| B low abrasion protection | 100-499 strokes |
| C moderate abrasion protection | 500-999 strokes |
| D high abrasion protection | 1000-4999 strokes |
| E very high abrasion protection | 5000-14999 strokes |
| F extremely high abrasion protection | ≥15000 strokes |

The test specimen, with a length of 10 cm, is bonded in one ply in longitudinal direction to a steel mandrel having a thickness of 5 or 10 mm. The abrading tool used is a steel wire with a diameter of 0.45 mm, which passes abrasively over the middle of the test specimen under a weight load of 7 N. The numerical measure of the abrasion properties is the number of back-and-forth strokes until the test specimen is destroyed. In the case of very high abrasion resistances, it has been found appropriate to measure the adhesive tape on a metal mandrel with a 5 mm diameter as well. As a result, abrasion resistance relative to relatively sharp articles such as a metal edge, for example, can also be simulated.

The measurement method according to the LV 312 standard from October 2009 is set out comprehensively below in conjunction with FIGS. 1 and 2.

Figure 1:
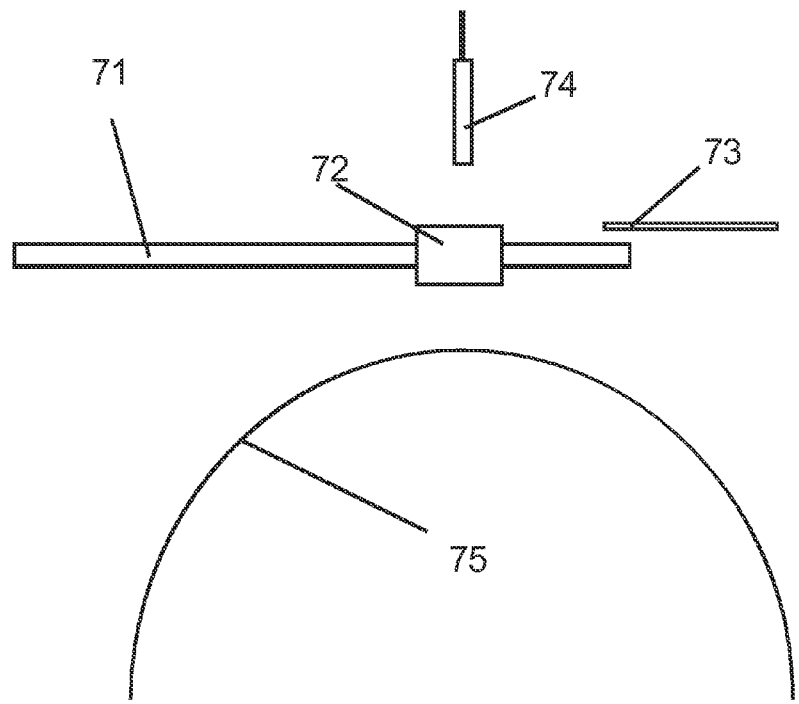
FIG. 1 shows the construction of the measuring apparatus in side elevation.
Figure 2:
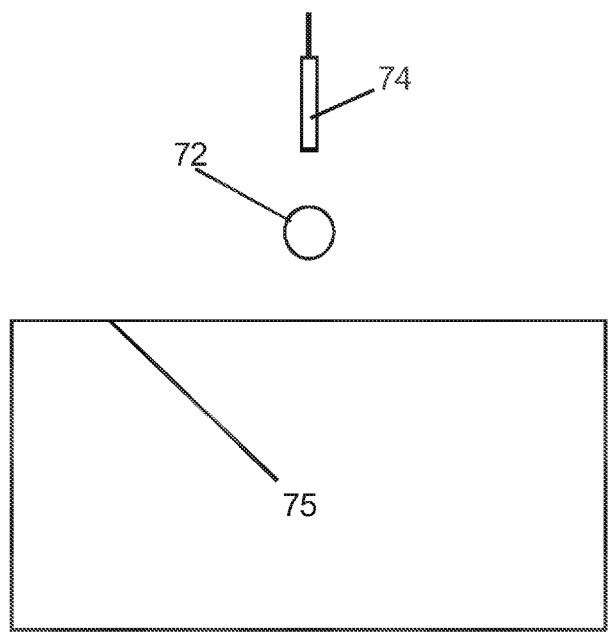
FIG. 2 shows the same construction in horizontal elevation.

With this measurement method, a defined steel rod 71 (diameter 8 mm, lever length of 220 mm) is provided with a test specimen 72—that is, adhesive tape—and is dropped with a force of 0.16 N from a height of 20 mm, having been released from the stop 73, onto an aluminum panel 75. The aluminum panel has dimensions in the undeformed state of 350×190×0.3 [mm] and is arranged in the form of a half-barrel beneath the test specimen 72, producing an extent of 290 mm.

The resultant sound is detected by means of a microphone 74, located 50 mm above the point of impact, and a commercial sound meter, for example of type 2239 from Bruel & Kjaer, in the form of the sound pressure level (Lsp) with a frequency evaluation of A (frequency range from, for example, 20 to 12 500 Hz) and a time evaluation of S (Slow).

The damping is reported as the difference between the blank value, with the unwrapped steel rod, and the respective measurement value, in dB(A).

It is an object of the invention to achieve a marked improvement on the prior art and to provide an adhesive tape which in the case of wrapping in helical line form is not bonded with the jacketed substrate, which is mechanically stable and which is easy to produce.

This object is achieved by means of an adhesive tape as is characterized more closely in the main claim. The dependent claims describe advantageous embodiments of the invention. Further embraced by the concept of the invention are the use of the tape of the invention, and also a cable loom jacketed with the tape.

The invention accordingly provides an adhesive tape consisting of a carrier having a top face and a bottom face, an adhesive layer and a liner, the carrier having a width $B_T$ based on the transverse direction, and also of an adhesive layer applied on the bottom face of the carrier where applied on the open side of the adhesive layer is a sheetlike liner having a transverse-direction-based width $B_A$, which is greater than or equal to the width $B_T$, the liner having an offset relative to the carrier in transverse direction, with a width $B_{VS}$.

In a first advantageous embodiment, the part of the top face of the liner that is not located beneath the adhesive layer of the adhesive tape is not provided with adhesive furnishing.

According to another advantageous embodiment, the ratio of the width $B_T$ to the width $B_A$ lies between 1.0:1.0 and 1.0:1.5, more preferably between 1.0:1.0 and 1.0:1.3, more preferably at 1.0:1.0.

The width $B_{VS}$ of the offset lies preferably between 0.4*width $B_T$ and 0.6*width $B_T$, more preferably at 0.5*width $B_T$.

One especially advantageous variant of the adhesive tape of the invention is characterized in that
a) the ratio of the width $B_T$ to the width $B_A$ lies at 1.0:1.0 and
b) the width $B_{VS}$ of the offset lies at 0.5*width $B_T$.

In practice, the following values for the width of the carrier and/or liner have proved to be particularly advantageous:

Carrier: 15 mm to 35 mm

Liner: 15 mm to 52.5 mm

Furthermore, the minimum overlap $B_L$ between carrier and non-adhesive liner ought to amount to 5 mm.

As carrier material and liner for the adhesive tape it is possible to use all known textile carriers such as wovens, knits or nonwoven webs; the term "web" embraces at least textile sheetlike structures in accordance with EN 29092 (1988) and also stitchbonded nonwovens and similar systems. Liner and carrier material here need not necessarily consist of the same materials.

It is likewise possible to use spacer fabrics, including both wovens and knits, with lamination.

Spacer fabrics of this kind are disclosed in EP 0 071 212 B1. Spacer fabrics are matt-like layer structures comprising a cover layer of a fibre or filament fleece, an underlayer and individual retaining fibres or bundles of such fibres between these layers, these fibres being distributed over the area of the layer structure, being needled through the particle layer and joining the cover layer and the underlayer to one another. As an additional although not mandatory feature, the retaining fibres in accordance with EP 0 071 212 B1 contain particles of inert minerals, such as sand, gravel or the like, for example.

The holding fibres needled through the particle layer hold the cover layer and the underlayer at a distance from one another and are joined to the cover layer and the underlayer.

Nonwovens contemplated include, in particular, consolidated staple fibre webs, but also filament webs, meltblown webs and spunbonded webs, which generally require additional consolidation. Possible consolidation methods known for webs include mechanical, thermal and chemical consolidation. Whereas with mechanical consolidations the fibres are held together purely mechanically usually by entanglement of the individual fibres, by the interlooping of fibre bundles or by the stitching-in of additional threads, it is possible by thermal and by chemical techniques to obtain adhesive (with binder) or cohesive (binderless) fibre-fibre bonds. Given appropriate formulation and an appropriate process regime, these bonds may be restricted exclusively, or at least predominantly, to fibre nodal points, so that a stable, three-dimensional network is formed while retaining the relatively loose, open structure in the web.

Webs which have proved to be particularly advantageous are those consolidated in particular by overstitching with separate threads or by interlooping.

Consolidated webs of this kind are produced for example on stitchbonding machines of the "Malifleece" type from the company Karl Meyer, formerly Malimo, and can be obtained from companies including Naue Fasertechnik and Techtex GmbH. Malifleece is characterized in that a cross-laid web is consolidated by the formation of loops from fibres of the web.

The carrier used may also be a web of the Kunit or Multiknit type. A Kunit web is characterized in that it originates from the processing of a longitudinally oriented fibre web to form a sheetlike structure which has the heads and legs of loops on one side and has loop feeds or pile fibre folds on the other side, but possesses neither threads nor prefabricated sheetlike structures. A web of this kind as well has been produced for a relatively long time on stitchbonding machines of the "Kunitvlies" type from the company Karl Mayer. A further characterizing feature of this web is that, as a longitudinal-fibre web, it is able to absorb high tensile forces in the longitudinal direction. The characteristic feature of a Multiknit web relative to the Kunit web is that the web is consolidated on both the top and bottom sides by virtue of the double-sided needle punching.

Finally, stitchbonded webs as an intermediate are also suitable for forming a liner of the invention and a carrier of the invention. A stitchbonded web is formed from a nonwoven material having a large number of stitches extending parallel to one another. These stitches are brought about by the incorporation, by stitching or knitting, of continuous textile threads. For this type of web, stitchbonding machines of the "Maliwatt" type from the company Karl Mayer, formerly Malimo, are known.

Also particularly suitable are needlefelt webs. With these webs, fibres or fibre webs are needled into the tuft by means of needles provided with barbs. By alternate introduction and withdrawal of the needles, the material is consolidated on a needle bar, with the individual fibres interlooping to form a firm sheetlike structure. The duration of this procedure determines the thickness and strength of the fibre structures, which are in general lightweight, air-permeable and elastic.

Also particularly advantageous is a staple fibre web which is mechanically consolidated in the first step or is a wet-laid web laid hydrodynamically, in which between 2% and 50% by weight of the web fibres are fusible fibres, more particularly between 5% and 40% by weight of the web fibres.

A web of this kind is characterized in that the fibres are laid wet or, for example, a staple fibre web is preconsolidated by the formation of loops from fibres of the web or by needling, stitching or air-jet and/or water-jet treatment.

In a second step, thermofixing takes place, with the strength of the web being increased again by the melting, or partial melting, of the fusible fibres.

For the utilization of nonwovens in accordance with the invention, the adhesive consolidation of mechanically preconsolidated or wet-laid webs is of particular interest, it being possible to set consolidation to take place by way of the addition of binder in solid, liquid, foamed or paste-like form. A great diversity of theoretical embodiments is possible: for example, solid binders as powders for trickling in; as a sheet or as a mesh; or in the form of binding fibres. Liquid binders may be applied as solutions in water or organic solvents, or as a dispersion. For adhesive consolidation, binding dispersions are predominantly selected: thermosets in the form of phenolic or melamine resin dispersions, elastomers as dispersions of natural or synthetic rubbers or, usually, dispersions of thermoplastics such as acrylates, vinyl acetates, polyurethanes, styrene-butadiene systems, PVC, and the like, and also copolymers thereof. Normally the dispersions are anionically or nonionically stabilized, although in certain cases cationic dispersions may also be of advantage.

The binder may be applied in a manner which is in accordance with the prior art and for which it is possible to consult, for example, standard works of coating or of nonwoven technology such as "Vliesstoffe" (Georg Thieme Verlag, Stuttgart, 1982) or "Textiltechnik-Vliesstofferzeugung" (Arbeitgeberkreis Gesamttextil, Eschborn, 1996).

For mechanically preconsolidated webs which already possess sufficient composite strength, the single-sided spray application of a binder is appropriate for producing specific changes in the surface properties.

Such a procedure not only is sparing in its use of binder but also greatly reduces the energy requirement for drying. Since no squeeze rolls are required and the dispersions remain predominantly in the upper region of the web material, unwanted hardening and stiffening of the web can be largely avoided.

For sufficient adhesive consolidation of the web backing, the addition of binder in the order of magnitude of 1% to 50%, more particularly 3% to 20%, based on the weight of the fibre web, is generally required.

The binder may be added as early as during the manufacture of the web, in the course of mechanical preconsolidation, or else in a separate process step, which may be carried out in-line or off-line. Following the addition of binder, it is necessary temporarily to generate a condition for the binder in which the binder becomes adhesive and adhesively connects the fibres—this may be achieved during the drying, for example, of dispersions, or else by means of heating, with further possibilities for variation existing by way of areal or partial application of pressure. The binder may be activated in known drying tunnels, or else, given an appropriate selection of binder, by means of infra-red radiation, UV radiation, ultra-sound, high-frequency radiation or the like. For the subsequent end use it is sensible, though not absolutely necessary, for the binder to have lost its tack following the end of the web production process. It is advantageous that, as a result of the thermal treatment, volatile components such as fibre assistants are removed, giving a web having favourable fogging values, so that when a low-fogging adhesive is used, it is possible to produce an adhesive tape having particularly favourable fogging values; accordingly, the liner as well has a very low fogging value.

By fogging (see DIN 75201 A) is meant the effect where, under unfavourable conditions, compounds of low molecular mass may outgas from the adhesive tapes and condense on cold parts. As a result of this it is possible, for example, for the view through the windscreen to be adversely affected.

A further special form of adhesive consolidation involves activating the binder by partial dissolution or partial swelling. In this case it is also possible in principle for the fibres themselves, or admixed specialty fibres, to take over the function of the binder. Since, however, such solvents are objectionable on environmental grounds, and/or are problematic in their handling, for the majority of polymeric fibres, this process is not often employed.

Starting materials envisaged for the textile carrier are, in particular, polyester, polypropylene, viscose or cotton fibres. The present invention, however, is not restricted to the stated materials; instead, as evident to the skilled person without having to take an inventive step, a multiplicity of further fibres may be used for producing the web.

Also suitable is a liner which consists of paper, of a laminate, of a film (for example PP, PE, PET, PA, PU), of foam or of a foamed film.

The stated materials can also be used advantageously as carrier material for the adhesive tape.

These non-textile sheetlike materials are especially appropriate when specific requirements necessitate such a modification of the invention. Films are generally thinner in comparison to textiles, for example, and, as a result of the imperforate layer, offer additional protection against penetration by chemicals and service fluids such as oil, petrol, antifreeze and the like into the actual cable area, and can be substantially adapted to requirements by an appropriate selection of the material from which they are constructed. With polyurethanes or polyolefin copolymers, for example, flexible and elastic jackets can be produced; with polyester and polyamides, very good abrasion resistance and temperature stability are achieved.

Foams or foamed films, on the other hand, possess the qualities of more substantial space filling and of good soundproofing—where a length of cable is laid, for example, in a duct-like or tunnel-like area in the vehicle, a jacketing tape of appropriate thickness and soundproofing can prevent disruptive flapping and vibration from the outset.

In accordance with another preferred embodiment of the invention, the basis weight of the carrier lies between 30 g/m$^2$ and 180 g/m$^2$.

Producing an adhesive tape from the carrier can be done using any known adhesive systems. As well as natural- or synthetic rubber-based adhesives it is possible in particular to use silicone adhesives and also polyacrylate adhesives, preferably a pressure-sensitive acrylate hotmelt adhesive. On account of their particular suitability as an adhesive for wrapping tapes for automotive cable harnesses, in respect of freedom from fogging, and also of outstanding compatibility with both PVC and PVC-free core insulation, preference is given to solvent-free acrylate hotmelts, as described in more detail in DE 198 07 752 A1 and in DE 100 11 788 A1.

The coatweight varies preferably in the range between 15 to 200 g/m$^2$, more preferably 30 to 120 g/m$^2$ (corresponding approximately to a thickness of 15 to 200 μm, more preferably 30 to 120 μm).

The adhesive is preferably a pressure-sensitive adhesive, in other words an adhesive which even under relatively weak applied pressure allows durable bonding to virtually all substrates and which after use can be detached from the substrate again substantially without residue. A pressure-sensitive adhesive has a permanently pressure-sensitive adhesive effect at room temperature, in other words possessing a sufficiently low viscosity and a high tack, and so the surface of the bonding substrate in question is wetted even with low applied pressure. The bondability of the adhesive derives from its adhesive properties, and the redetachability from its cohesive properties.

A suitable adhesive is one based on acrylate hotmelt, having a K value of at least 20, more particularly greater than 30 (measured respectively in 1% strength by weight solution in toluene, 25° C.), obtainable by concentrating a solution of such an adhesive to form a system which can be processed as a hotmelt.

The K value (according to Fikentscher) is a measure of the average molecular size of high-polymer compounds. The viscosity of polymers is determined using a capillary viscometer in accordance with DIN EN ISO 1628-1:2009.

For the purpose of the measurement, one percent strength (1 g/100 ml) toluenic polymer solutions are prepared at 25° C. and are subjected to measurement using the corresponding DIN Ubbelohde viscometer in accordance with ISO 3105: 1994, Table B.9.

The concentrating process may take place in appropriately equipped vessels or extruders; especially in the case of accompanying degassing, a venting extruder is preferred.

One such adhesive is set out in DE 43 13 008 C2. In an intermediate step, the solvent is removed entirely from these acrylate adhesives produced in this way.

In addition, further volatile constituents are removed during this procedure. After coating from the melt, these adhesives have only small residual fractions of volatile constituents. Hence it is possible to adopt all of the monomers/formulas that are claimed in the patent recited above.

The solution of the adhesive may contain 5% to 80% by weight of solvent, more particularly 30% to 70% by weight.

It is preferred to use commercial solvents, more particularly low-boiling hydrocarbons, ketones, alcohols and/or esters.

With further preference, single-screw, twin-screw or multi-screw extruders are used that have one or, more particularly, two or more venting units.

The acrylate hotmelt-based adhesive may have had benzoin derivatives incorporated into it by polymerization, examples being benzoin acrylate or benzoin methacrylate, acrylic or methacrylic esters. Benzoin derivates of this kind are described in EP 0 578 151 A.

The acrylate hotmelt-based adhesive may be UV-crosslinked. Other modes of crosslinking are also possible, however, an example being electron beam crosslinking. In another preferred embodiment, self-adhesives used are copolymers of (meth)acrylic acid and esters thereof having 1 to 25 C atoms, maleic, fumaric and/or itaconic acid, and/or their esters, substituted (meth)acrylamides, maleic anhydride and other vinyl compounds, such as vinyl esters, more particularly vinyl acetate, vinyl alcohols and/or vinyl ethers.

The residual solvent content ought to be below 1% by weight.

One adhesive which is found to be particularly suitable is a pressure-sensitive acrylate hotmelt adhesive of the kind carried under the name acResin, more particular acResin A260, by BASF. This low-K-value adhesive acquires its application-compatible properties by virtue of a concluding, radiation-chemically initiated crosslinking.

The adhesive may be applied in the form of a stripe in the longitudinal direction of the adhesive tape, the width of the stripe being lower than that of the carrier of the adhesive tape.

The width here is selected such that, first, the adhesive tape adheres sufficiently and, secondly, the liner is adequately fixed.

Depending on the particular utility, it is also possible for the carrier material to be coated with a plurality of parallel stripes of the adhesive.

The position of the stripe on the carrier is freely selectable, preference being given to an arrangement directly at one of the edges of the carrier.

Preparation and processing of the adhesives may take place from solution, from dispersion, and from the melt. Preferred preparation and processing procedures take place from solution and also from the melt. It is particularly preferred to manufacture the adhesive from the melt, in which case, in particular, batch methods or continuous methods may be employed. The continuous manufacture of the pressure-sensitive adhesives with the aid of an extruder is particularly advantageous.

The adhesives thus prepared may then be applied to the carrier using the methods that are common knowledge. In the case of processing from the melt, these application methods may involve a nozzle or a calender.

In the case of processes from solution, coating operations with doctor blades, knives or nozzles are known, to name but a few.

Also possible is the transfer of the adhesive from an anti-adhesive carrier cloth or release liner onto the carrier assembly.

If the adhesive tape described is to be of low flammability, this quality can be achieved by adding flame retardants to the carrier, the liner and/or the adhesive. These retardants may be organobromine compounds, if required with synergists such as antimony trioxide, although, with regard to the absence of halogen from the adhesive tape, preference will be given to using red phosphorus, organophosphorus compounds, mineral compounds or intumescent compounds such as ammonium polyphosphate, alone or in conjunction with synergists.

The general expression "adhesive tape" in the context of this invention encompasses all sheetlike structures such as two-dimensionally extended sheets or sheet sections, tapes with extended length and limited width, tape sections and the like, and also, lastly, diecuts or labels.

The adhesive tape can be produced in the form of a roll, in other words wound up onto itself in the form of an Archimedean spiral.

The reverse face of the adhesive tape may be coated with a reverse-face lacquer in order to exert a favourable influence on the unwind properties of the adhesive tape wound to an Archimedean spiral. This reverse-face lacquer may for this purpose be furnished with silicone compounds or fluorosilicone compounds and also with polyvinylstearylcarbamate, polyethyleniminestearylcarbamide or organofluorine compounds as adhesive substances.

The adhesive tape is preferably used for jacketing elongate material such as, more particularly, cable harnesses, the adhesive tape being passed around the elongate material in a spiral with the form of a helical line.

On account of the preferred embodiment of the adhesive tape, namely when the width $B_T$ is less than or equal to the width $B_A$, there is no contact of the adhesive with the material to be jacketed when wrapping takes the form of a helical line and when it is ensured that the liner in the next wrapped ply is always gaplessly adjacent to the liner of the previous ply.

The consequence of a ratio of width $B_T$ to width $B_A$ of 1.0:0.8 would be that the adhesive tape would have to be wrapped with an overlap, in order for the non-adhesive layer, formed from the overlying liners of the individual wrapped plies, not to have any gaps. The width of the overlap during wrapping cannot be monitored visually, and so the variant in which the width of the carrier $B_T$ is greater than the width of the liner $B_A$ represents one possible embodiment, but not a particularly advantageous embodiment.

Lastly, the concept of the invention also embraces an elongate material jacketed with an adhesive tape of the invention. The elongate material is preferably a cable harness.

The advantages of the adhesive tape of the invention are diverse.

In the case of wrapping in the form of a helical line around a cable loom, there is no contact between the adhesive and the cable insulation. The cable loom therefore retains a very high flexibility, and can easily be bent into the desired shape.

At the same time, the plurality of plies ensure that the adhesive tape features
high damping
high abrasion resistance
high temperature stability (for example T4 according to LV 312, in other words 3000 hours at a temperature of 150° C.).

As a result of the targeted combination of the materials of the carrier and of the liner, for example the combination of woven fabric and nonwoven web, it is possible to obtain a very high temperature stability, despite the temperature stability of the individual layers being well below the figure—in the case of nonwoven web, for example, only a maximum of T3 according to LV 312 and the Ford specification, in other words 3000 hours at a temperature of 125° C.

Since the adhesive tape is not joined (via an adhesive) with the cable loom, there is an increase in the abrasion resistance. The hose formed from the adhesive tape is able to slip very easily, and so the force, for example, of a locally limited mandrel (sharp-edged metal plate) is dispersed over a large, relatively smooth area.

The jacketing of the preferred cable loom provides it with outstanding protection and insulation from vibrations.

As a result of its originally round or oval cross-section, the cable loom of the invention facilitates its disruption-free passage through drilled holes, other holes, apertures and the like, and allows it subsequently to be deformed easily into other geometries and cross-sections, in order to conform as ideally as possible to the local circumstances.

Wrapping in helical line form allows a simple adaptation of diameter during wrapping at each point of the cable loom. Packaging of the cable loom is suitable only for long sections with consistent diameters.

Another advantage of the type of jacketing outlined is that flexing of the cable loom produces compression folds exerting high forces on the bonding seam extending perpendicularly to them, during packaging, it being possible that these forces will result in the jacketing breaking open. With the wrapping in helical line form, in contrast, the individual bonding seams are oriented almost parallel to the compression folds, and are therefore much better able to absorb forces.

The invention is elucidated in more detail using a number of examples, without any intention that these examples should restrict the invention in any way at all.

The measurements in the examples take place in accordance with the following standards:
Basis weights of the fabrics and of the coating of adhesive in accordance with DIN EN ISO 2286-1
Ultimate tensile strength and ultimate-tensile-strength elongation of the fabrics and adhesive tapes in longitudinal direction in accordance with DIN EN 14410 at the maximum of the elongation-at-break curve (clamped length 100 mm, tensioning speed 300 mm/min)

Bond strength in accordance with DIN EN 1939
Thickness of the fabrics and adhesive tapes in accordance with DIN EN 1942
Abrasion resistance in accordance with LV 312
Flexural stiffness in accordance with DIN 53362

In the examples, the carrier of the adhesive tape and the liner are laminated to one another without an offset, in order to simplify the measurement. The width of the laminate is 50 mm (the width of the carrier and of the liner is therefore 50 mm).

Between carrier and liner there is an acrylate-based adhesive, at 90 g/m² (acResin A 260).

| Example | A | B | C | D | E |
|---|---|---|---|---|---|
| Adhesive tape | PET fabric tape (M1) | PET fabric tape, orange (M2) | PET fabric tape (M1) | PET fabric tape (M1) | PET fabric tape (M1) |
| Liner | Needle felt 120 g/m² (M4) | Needle felt 120 g/m² (M4) | Needle felt 57 g/m² (M5) | Water-jet web 100 g/m² (M6) | PET film 25 µm (M3) |
| Damping LV 312 | 13.8 | 13.5 | 7.8 | 10.1 | 2.0 |
| Abrasion 5 mm/7 N LV 312 | 3795 | 3568 | 1882 | 3725 | 1265 |
| Thickness µm | 778 | 771 | 595 | 810 | 279 |
| Basis weight g/m² | 340 | 340 | 277 | 316 | 245 |
| Density kg/m³ | 437 | 441 | 465 | 390 | 879 |
| Temperature class as per Ford ES-AC3T-1A303-AA | 4 | 4 | 4 | 4 | 4 |
| Protection from liquid passage | No | No | No | No | Yes |
| Labelling | No | Yes | No | No | No |

In the table below, the properties of the carriers and liners used are investigated and reported.

| Material data | M1 | M2 | M3 | M4 | M5 | M6 |
|---|---|---|---|---|---|---|
| Adhesive tape | PET fabric tape | PET fabric tape, orange | — | — | — | — |
| Liner | — | — | PET film 25 µm | Needle felt 120 g/m² | Needle felt 57 g/m² | Water-jet web 100 g/m² |
| Damping LV 312 | 2.0 | 2.0 | 0.1 | 8.7 | 7.4 | 9.5 |
| Abrasion 5 mm/7 N LV 312 | 1738 | 1678 | 182 | 94 | 18 | 94 |
| Thickness µm | 259 | 251 | 133 | 668 | 361 | 552 |
| Basis weight g/m² | 220 | 220 | 93 | 120 | 57 | 96 |
| Density kg/m³ | 851 | 875 | 698 | 180 | 158 | 174 |
| Temperature class as per Ford ES-AC3T-1A303-AA | 4 | 4 | 3 | 3 | 3 | 3 |
| Protection from liquid passage | No | No | Yes | No | No | No |
| Labelling | No | No | No | No | No | No |

In the text below, the adhesive tape will be illustrated using a number of figures, without any intention that any restriction of whatever kind should be imposed therein.

Figure 3:
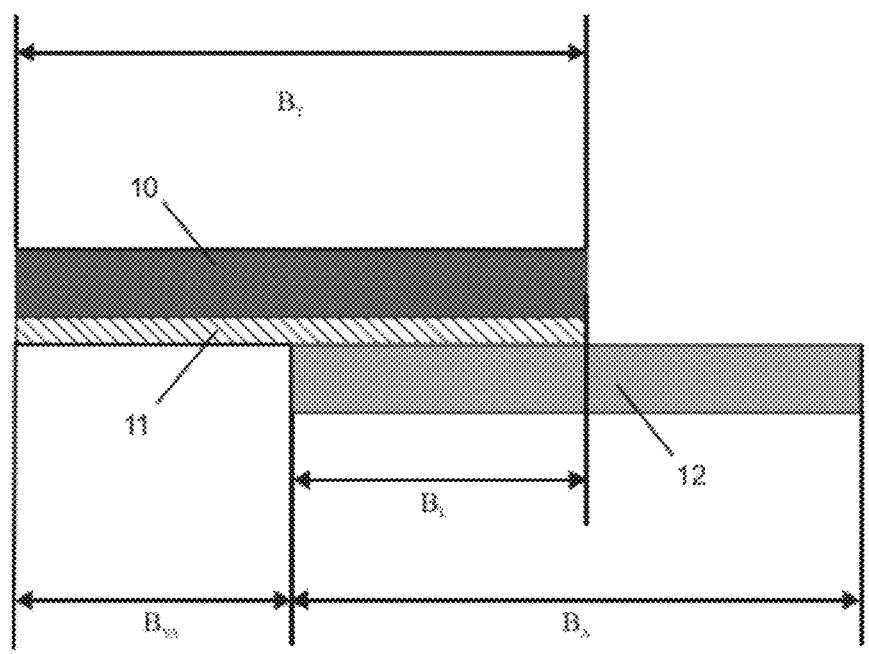
FIG. 3 shows the adhesive tape of the present invention in a lateral section.

Shown in FIG. 3 in a lateral section is the adhesive tape, consisting of a stitchbonded nonwoven carrier 10 having a width $B_T$, on the bottom face of which a layer of a self-adhesive coating 11 is applied.

Applied on the open side of the adhesive layer 11 is a sheetlike liner 12 having a transverse-direction-based width $B_A$, which is equal to the width $B_T$.

The liner 12 is applied with an offset relative to the carrier 10 in the transverse direction, this offset corresponding to the width $B_{VS}$. The width $B_{VS}$ corresponds to 0.5*the width $B_T$.

Figure 4:
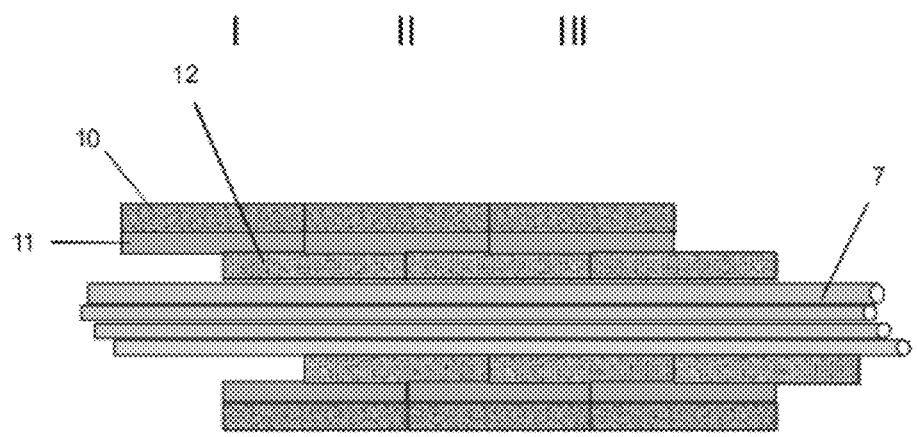
FIG. 4 shows an extract of a cable loom composed of a bundle of individual cables and jacketed with the adhesive tape of the invention.

Shown in FIG. 4 is an extract of a cable loom which is composed of a bundle of individual cables 7 and which is jacketed with the adhesive tape of the invention. The adhesive tape is passed, coming from the left and going to the right, in a helical movement around the cable loom.

The cable loom extract shown exhibits three wrapped plies, I, II and III, of the adhesive tape. Towards the left, further wrapped plies would extend, but are not shown here. The construction of the adhesive tape corresponds to that from FIG. 3.

The jacketing of the cable loom takes place in such a way that the adhesive layer 11 is bonded completely on the liner 12 of the adhesive tape section of the preceding wrapped ply.

Sticking of the layer 11 of adhesive to the cables 7 is ruled out.

The invention claimed is:

1. An adhesive tape consisting of a carrier having a top face, a bottom face, and a width $B_T$ based on the transverse direction, an adhesive layer applied on the bottom face of the carrier, and a liner applied on the open side of the adhesive layer, wherein a portion of the adhesive layer is exposed after the liner has been applied to the open side of the adhesive layer, wherein the liner has a transverse-direction-based width $B_A$, which is greater than or equal to the width $B_T$, and an offset relative to the carrier in transverse direction, with a width $B_{VS}$, wherein the ratio of the width $B_T$ to the width $B_A$ lies between 1.0:1.0 and 1.0:1.5 and the width $B_{VS}$ of the offset lies between 0.4*width $B_T$ and 0.6*width $B_T$.

2. The adhesive tape according to claim 1, wherein the part of the top face of the liner which is not located below the adhesive layer of the adhesive tape is not provided with adhesive furnishing.

3. The adhesive tape according to claim 1 wherein the ratio of the width $B_T$ to the width $B_A$ lies at 1.0:1.0 and the width $B_{VS}$ of the offset lies at 0.5*width $B_T$.

4. The adhesive tape according to claim 1 wherein the coating of adhesive comprises an adhesive based on natural rubber, synthetic rubber, acrylate.

5. The adhesive tape according to claim 1 wherein the ratio of the width $B_T$ to the width $B_A$ lies at 1.0:1.0.

6. The adhesive tape according to claim 1 wherein the width $B_{VS}$ of the offset lies at 0.4*width $B_T$.

7. An elongate material jacketed with an adhesive tape having a carrier, an adhesive layer and a liner, wherein the carrier has a width $B_T$ based on the transverse direction and the adhesive layer is applied on a bottom face of the carrier, wherein the liner is applied to the open side of the adhesive layer, wherein the liner has a transverse-direction-based width $B_A$, which is greater than or equal to the width $B_T$ and an offset relative to the carrier in transverse direction, with a width $B_{VS}$, wherein the ratio of the width $B_T$ to the width $B_A$ lies between 1.0:1.0 and 1.0:1.5 and the width $B_{VS}$ of the offset lies between 0.4*width $B_T$ and 0.6*width $B_T$, and further wherein the adhesive tape has been wrapped around the elongated material in a spiral in the form of a helical line.

8. The elongated material according to claim 7, wherein the adhesive layer comprises a silicone adhesive or a pressure-sensitive acrylate hotmelt adhesive.

9. The elongated material according to claim 7, wherein the elongate material is a lead, a cable harness or a cable loom.

10. An elongate material jacketed with an adhesive tape having a carrier, an adhesive layer and a liner, wherein the carrier has a width $B_T$ based on the transverse direction and the adhesive layer is applied on a bottom face of the carrier, wherein the liner is applied to the open side of the adhesive layer, wherein the liner has a transverse-direction-based width $B_A$, which is greater than or equal to the width $B_T$ and an offset relative to the carrier in transverse direction, with a width $B_{VS}$, wherein the ratio of the width $B_T$ to the width $B_A$ lies between 1.0:1.0 and 1.0:1.5 and the width $B_{VS}$ of the offset lies between 0.4*width $B_T$ and 0.6*width $B_T$, and further wherein the liner is located between the adhesive layer and the elongate material after the adhesive tape has been wrapped around the elongate material.

11. The elongated material according to claim 10, wherein the elongate material is a lead, a cable harness or a cable loom.

12. The elongated material according to claim 10, wherein the adhesive tape is wrapped around the elongate material such that none of the adhesive layer contacts the elongated material.

* * * * *